(12) United States Patent
Chiu

(10) Patent No.: US 7,870,812 B2
(45) Date of Patent: Jan. 18, 2011

(54) FRUIT CUTTER THAT CUTS FRUIT EXACTLY AND SMOOTHLY

(76) Inventor: Te-Sheng Chiu, 75, San-Ming St., Dong-Shi Chen, Taichung Hsien (TW)

( * ) Notice: Subject to any disclaimer, the term of this patent is extended or adjusted under 35 U.S.C. 154(b) by 501 days.

(21) Appl. No.: 11/950,471

(22) Filed: Dec. 5, 2007

(65) Prior Publication Data
US 2008/0168660 A1    Jul. 17, 2008

(30) Foreign Application Priority Data
Jan. 12, 2007    (CN) .................... 2007 2 0066276

(51) Int. Cl.
*B23D 15/00* (2006.01)
*B23D 17/00* (2006.01)
*B26D 7/06* (2006.01)
*A23N 4/04* (2006.01)
*A47J 17/00* (2006.01)
*A23N 3/00* (2006.01)
*A47J 25/00* (2006.01)
*B26D 1/00* (2006.01)
*B02C 15/00* (2006.01)
*B23D 19/00* (2006.01)

(52) U.S. Cl. .................... 83/435.15; 99/537; 99/545; 99/509; 99/510; 99/512

(58) Field of Classification Search .............. 83/435.15; 99/537, 545, 509–512
See application file for complete search history.

(56) References Cited

U.S. PATENT DOCUMENTS

| | | | | | |
|---|---|---|---|---|---|
| 1,040,582 | A | * | 10/1912 | Royer et.al. .................... | 99/509 |
| 1,943,113 | A | * | 1/1934 | Daum ......................... | 83/620 |
| 2,297,177 | A | * | 9/1942 | Tiffany ........................ | 83/620 |
| 2,560,229 | A | * | 7/1951 | Leavens ....................... | 83/588 |
| 2,645,262 | A | * | 7/1953 | Marasco .................. | 83/435.15 |
| 2,647,549 | A | * | 8/1953 | Koch ........................... | 99/509 |
| 4,569,280 | A | * | 2/1986 | D'Ambro et al. ............. | 99/538 |
| 6,596,329 | B1 | * | 7/2003 | D'Ambro et al. ........... | 426/484 |
| 6,666,574 | B1 | * | 12/2003 | Pryor ......................... | 366/205 |

* cited by examiner

*Primary Examiner*—Ghassem Alie
*Assistant Examiner*—Bharat C Patel

(57) ABSTRACT

A fruit cutter includes a fixed seat, and a cutting device movable relative to the fixed seat. The cutting device includes a movable seat and a blade unit. The blade unit includes a plurality of cutting blades. The cutting blades have an intersection provided with a sharp tapered drilling portion. Each of the cutting blades has a mediate portion provided with a concave guide edge. Thus, the drilling portion of the cutting blades is inserted into the central portion of the fruit to pierce the fruit, while the cutting blades of the blade unit extend from the central portion toward the rim of the fruit to cut and separate the fruit by guidance of the guide edge of each of the cutting blades, so that the fruit is cut into multiple parts easily and quickly.

17 Claims, 9 Drawing Sheets

FRUIT CUTTER THAT CUTS FRUIT EXACTLY AND SMOOTHLY

BACKGROUND OF THE INVENTION

1. Field of the Invention

The present invention relates to a cutter and, more particularly, to a fruit cutter for cutting and separating a fruit.

2. Description of the Related Art

A conventional fruit cutter in accordance with the prior art shown in FIG. 8 comprises a press ring 60 having a periphery provided with two press handles 64, and a plurality of cutting blades 62 mounted in the press ring 60. The cutting blades 62 are arranged in a radiating manner. Thus, when the press ring 60 is driven by a force to press a fruit, the fruit is cut into multiple parts by the cutting blades 62.

Another conventional fruit cutter in accordance with the prior art shown in FIG. 9 comprises a press ring 60 having a periphery provided with two press handles 64, and a plurality of cutting blades 62 mounted in the press ring 60. The cutting blades 62 are arranged in a radiating manner and have an intersection provided with a ring 66. Thus, when the press ring 60 is driven by a force to press a fruit, the fruit is cut into multiple parts by the cutting blades 62.

However, when the fruit is pressed and squeezed by the press ring 60, the fruit is easily deformed and broken due to the pressure applied by the press ring 60, so that the juice of the fruit easily flows outwardly. In addition, the cutting blades 62 contact the surface of the fruit before cutting the fruit, so that the dirt on the surface of the fruit is attached to the cutting blades 62 and is infiltrated into the fruit through the cutting blades 62, thereby causing a sanitary problem.

BRIEF SUMMARY OF THE INVENTION

In accordance with the present invention, there is provided a fruit cutter, comprising a fixed seat, and a cutting device movable relative to the fixed seat. The cutting device includes an annular movable seat movable relative to the fixed seat, and a blade unit mounted in the movable seat. The blade unit of the cutting device includes a plurality of cutting blades movable toward to the fixed seat. The cutting blades of the blade unit have an intersection provided with a substantially sharp tapered drilling portion that extends downward and is directed toward the fixed seat. Each of the cutting blades of the blade unit has a mediate portion provided with a concave guide edge.

The primary objective of the present invention is to provide a fruit cutter that cuts a fruit exactly and smoothly.

Another objective of the present invention is to provide a fruit cutter, wherein the drilling portion of the cutting blades is inserted into the central portion of the fruit to pierce the fruit easily, while the cutting blades of the blade unit extend from the central portion toward the rim of the fruit to cut and separate the fruit smoothly by guidance of the guide edge of each of the cutting blades, so that the fruit is cut into multiple parts easily and quickly.

A further objective of the present invention is to provide a fruit cutter, wherein the cutting blades of the blade unit cut the fruit gradually from the central portion toward the rim of the fruit, so that the cutting blades of the blade unit will not touch the surface of the fruit to achieve a sanitary purpose.

A further objective of the present invention is to provide a fruit cutter, wherein the cutting blades of the blade unit extend through the fruit into the grooves of the anvil so as to cut the fruit completely.

A further objective of the present invention is to provide a fruit cutter, wherein the locking hook of the locking unit is movable to lock the locking flange of the fixed ring after the cutting device touches the fixed seat to lock the movable seat of the cutting device onto the support member of the fixed seat so as to hidden the cutting blades of the blade unit in the grooves of the anvil to achieve a safety function.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
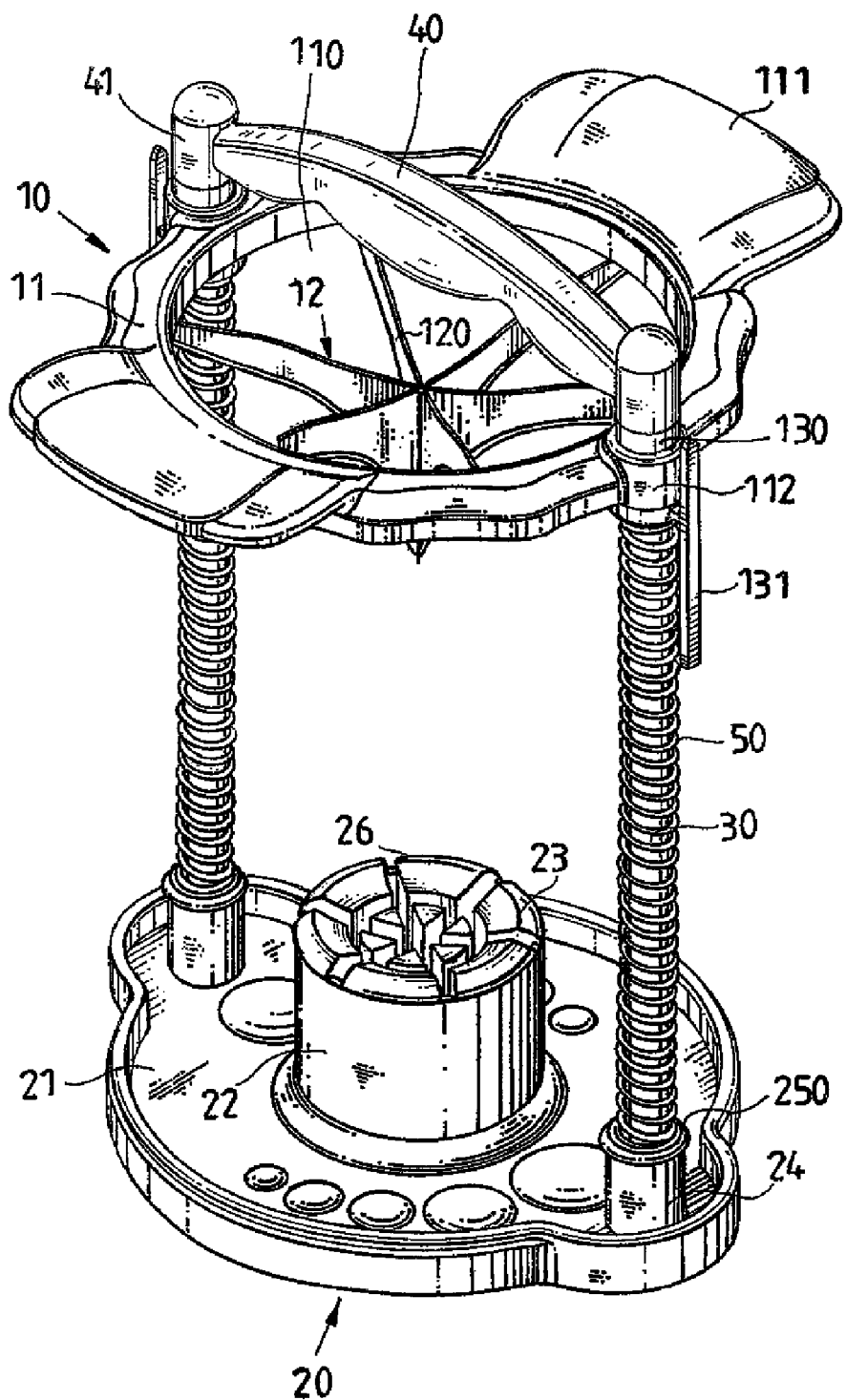
FIG. 1 is a perspective view of a fruit cutter in accordance with the preferred embodiment of the present invention.

Referring to the drawings and initially to FIGS. 1-4, a fruit cutter in accordance with the preferred embodiment of the present invention comprises a fixed seat 20, and a cutting device 10 movable relative to the fixed seat 20. The cutting device 10 includes an annular movable seat 11 movable relative to the fixed seat 20, and a blade unit 12 mounted in the movable seat 11. The blade unit 12 of the cutting device 10 includes a plurality of cutting blades 120 movable toward to the fixed seat 20. The cutting blades 120 of the blade unit 12 are arranged in a radiating manner in the movable seat 11 and are spaced from each other in an equally angular manner.

Figure 2:
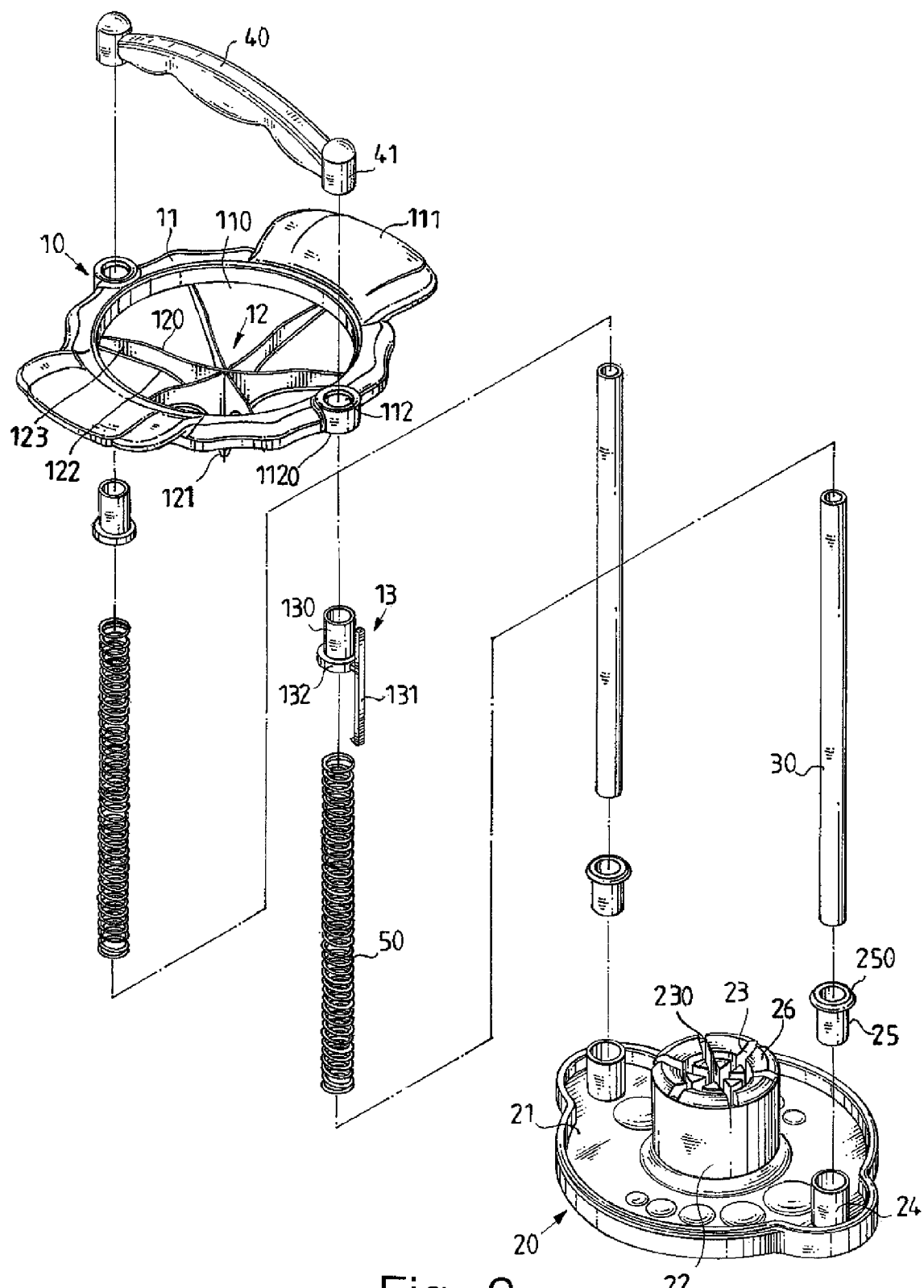
FIG. 2 is an exploded perspective view of the fruit cutter as shown in FIG. 1.
Figure 2A:
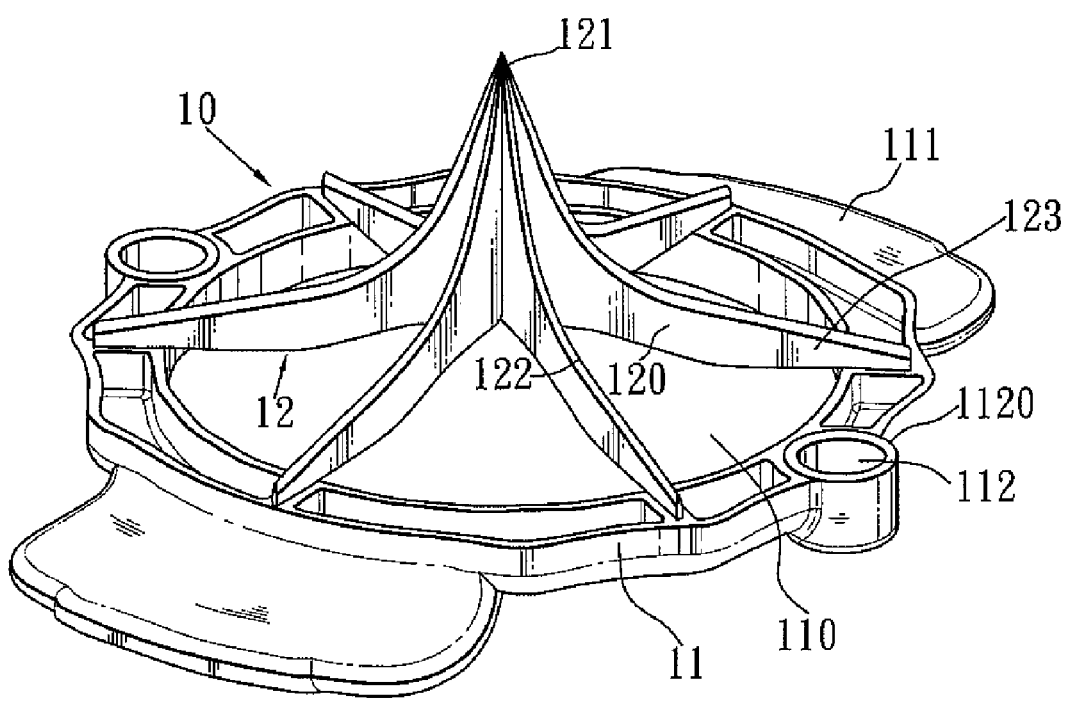
FIG. 2A is a perspective view of a cutting device of the fruit cutter as shown in FIG. 2.
Figure 3:
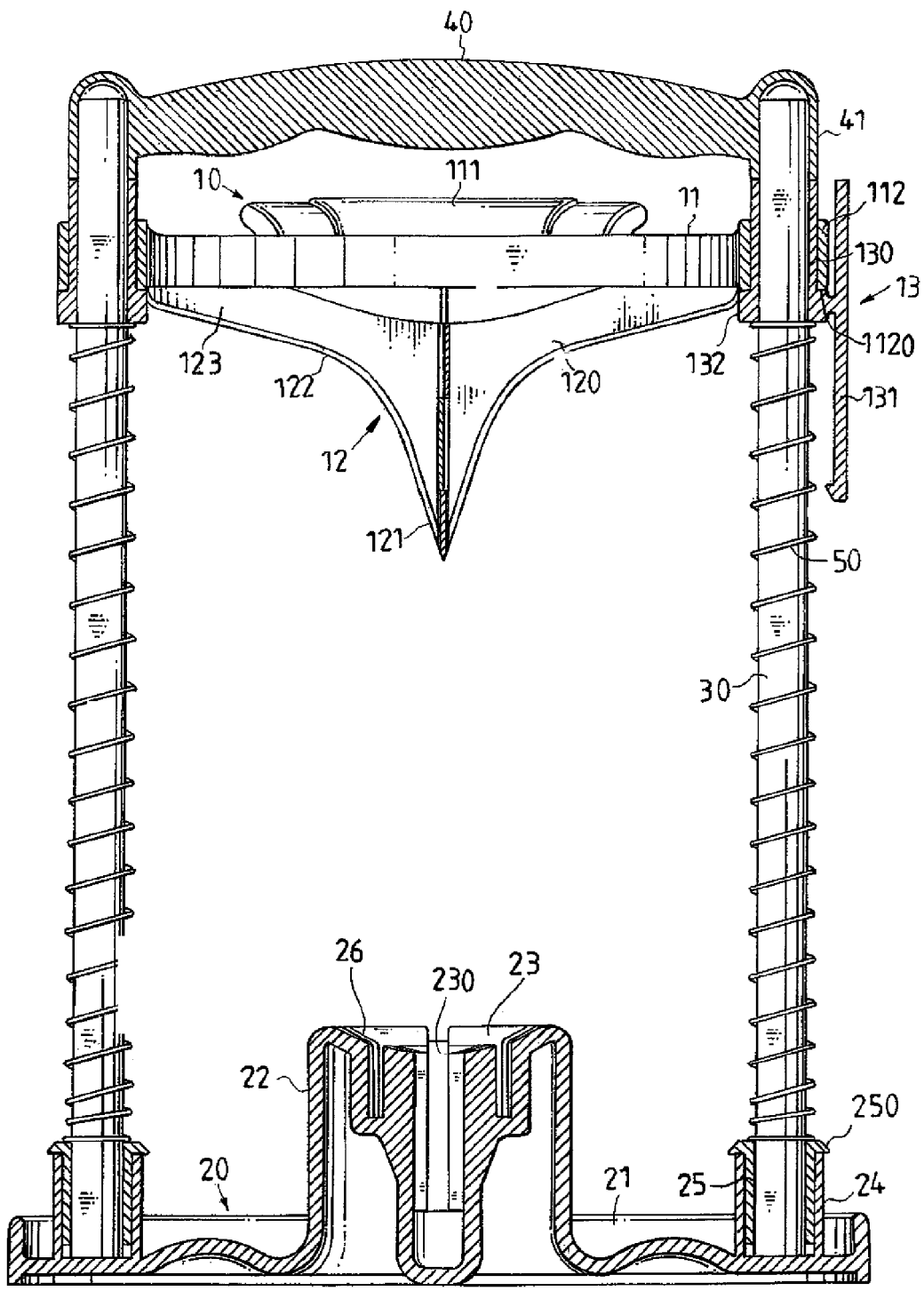
FIG. 3 is a front cross-sectional view of the fruit cutter as shown in FIG. 1.

The cutting blades 120 of the blade unit 12 have an intersection provided with a substantially sharp tapered drilling portion 121 (see FIG. 2A) that extends downward and is directed toward the fixed seat 20. The drilling portion 121 is located at a central portion of the cutting blades 120. Each of the cutting blades 120 of the blade unit 12 has a first end 123 connected to the movable seat 11 and a second end connected to the drilling portion 121. Each of the cutting blades 120 of the blade unit 12 has a mediate portion provided with a concave guide edge 122 located between the first end 123 of each of the cutting blades 120 and the drilling portion 121.

The fruit cutter further comprises two opposite guide rods 30 each having a lower end mounted on the fixed seat 20 wherein the cutting device 10 is movably mounted between the two guide rods 30, a pull handle 40 mounted an upper end of each of the two guide rods 30 wherein the movable seat 11 of the cutting device 10 is movable between the fixed seat 20 and the pull handle 40, and two opposite torsion springs 50 each mounted on a respective one of the two guide rods 30 and each biased between the movable seat 11 of the cutting device 10 and the fixed seat 20 to push the movable seat 11 of the cutting device 10 toward the pull handle 40.

The pull handle 40 has two opposite ends each provided with a protruding mounting sleeve 41 mounted on the upper end of a respective one of the two guide rods 30.

The movable seat 11 of the cutting device 10 has an inner wall provided with a mounting hole 110 for mounting the blade unit 12 and a peripheral wall provided with two radially opposite mounting tubes 112 each movably mounted on a respective one of the two guide rods 30. The peripheral wall of the movable seat 11 is provided with two radially opposite protruding holding portions 111 to facilitate a user holding the movable seat 11 of the cutting device 10.

The fixed seat 20 includes a support member 21 to support the two guide rods 30 and an anvil 22 mounted on and protruding upwardly from a central portion of the support member 21 and located between the two guide rods 30. The support member 21 of the fixed seat 20 is provided with two opposite positioning sleeves 24 for mounting the two guide rods 30. The anvil 22 of the fixed seat 20 has a substantially circular shape and is provided with a plurality of axially extending grooves 23 to allow insertion of the cutting blades 120 of the blade unit 12. The grooves 23 of the anvil 22 are arranged in a radiating manner and are spaced from each other in an equally angular manner. The grooves 23 of the anvil 22 have an intersection 230 aligning with the drilling portion 121 of the cutting blades 120. The anvil 22 of the fixed seat 20 has a top provided with a concave face 26 connected to the grooves 23.

The fruit cutter further comprises at least one a fixed ring 25 inserted into one of the two positioning sleeves 24 of the support member 21 and provided with a protruding locking flange 250, and a locking unit 13 including a movable ring 130 inserted into one of the two mounting tubes 112 of the movable seat 11 to move therewith and a flexible locking hook 131 mounted on the movable ring 130 and movable to lock the locking flange 250 of the fixed ring 25 to lock the movable seat 11 of the cutting device 10 onto the support member 21 of the fixed seat 20. The fixed ring 25 is located between the one of the two positioning sleeves 24 of the support member 21 and the lower end of a respective one of the two guide rods 30, and the locking flange 250 of fixed ring 25 protrudes outwardly from the one of the two positioning sleeves 24 of the support member 21. The movable ring 130 of the locking unit 13 is located between the one of the two mounting tubes 112 of the movable seat 11 and the upper end of a respective one of the two guide rods 30 and has a lower end provided with a protruding stop flange 132 abutting a lower end 1120 of the one of the two mounting tubes 112 of the movable seat 11. The locking hook 131 of the locking unit 13 is formed on and extends outwardly from the stop flange 132 of the movable ring 130 so that the locking hook 131 of the locking unit 13 is spaced from the one of the two mounting tubes 112 of the movable seat 11.

Figure 4:
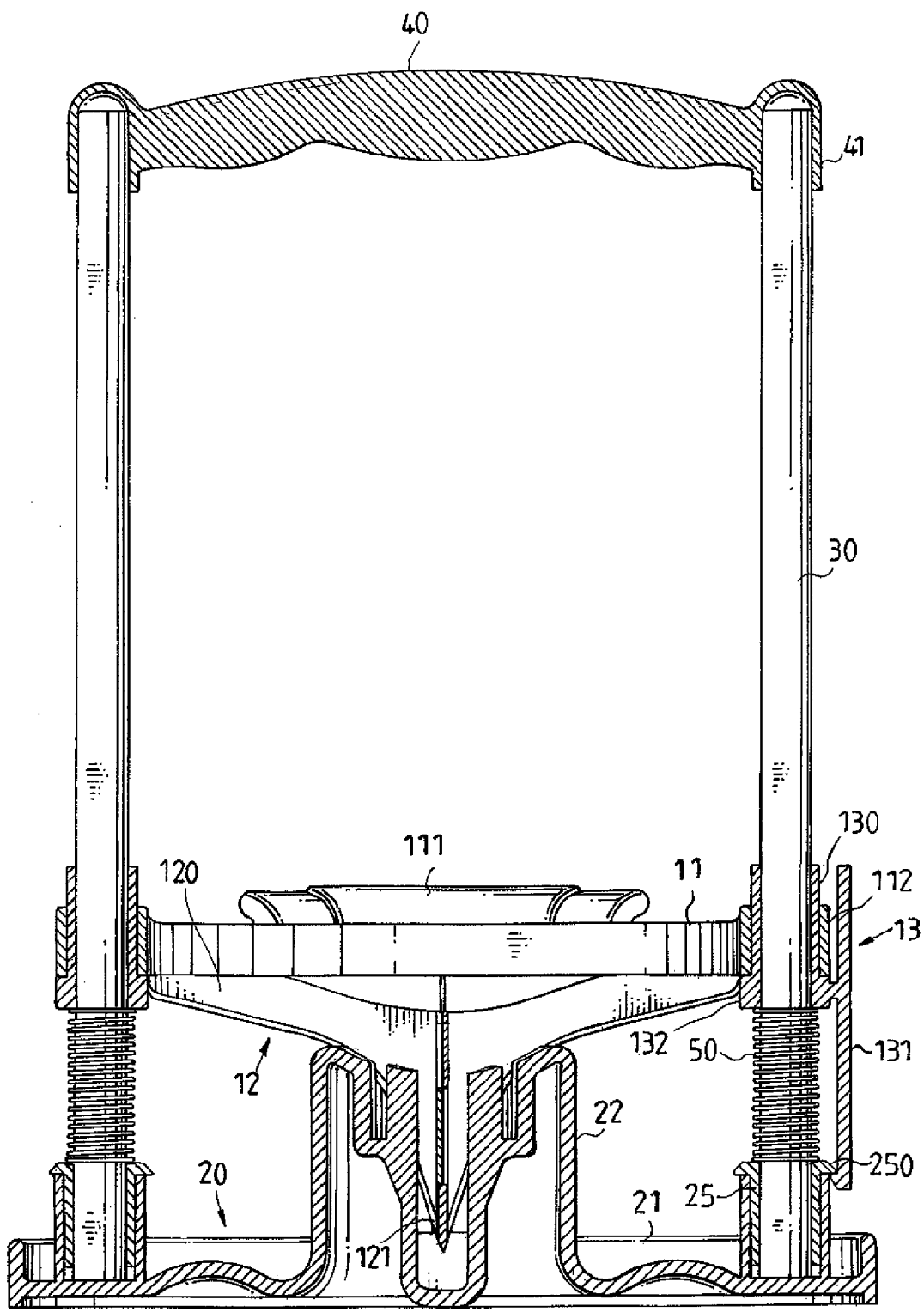
FIG. 4 is a schematic operational view of the fruit cutter as shown in FIG. 3.
Figure 5:
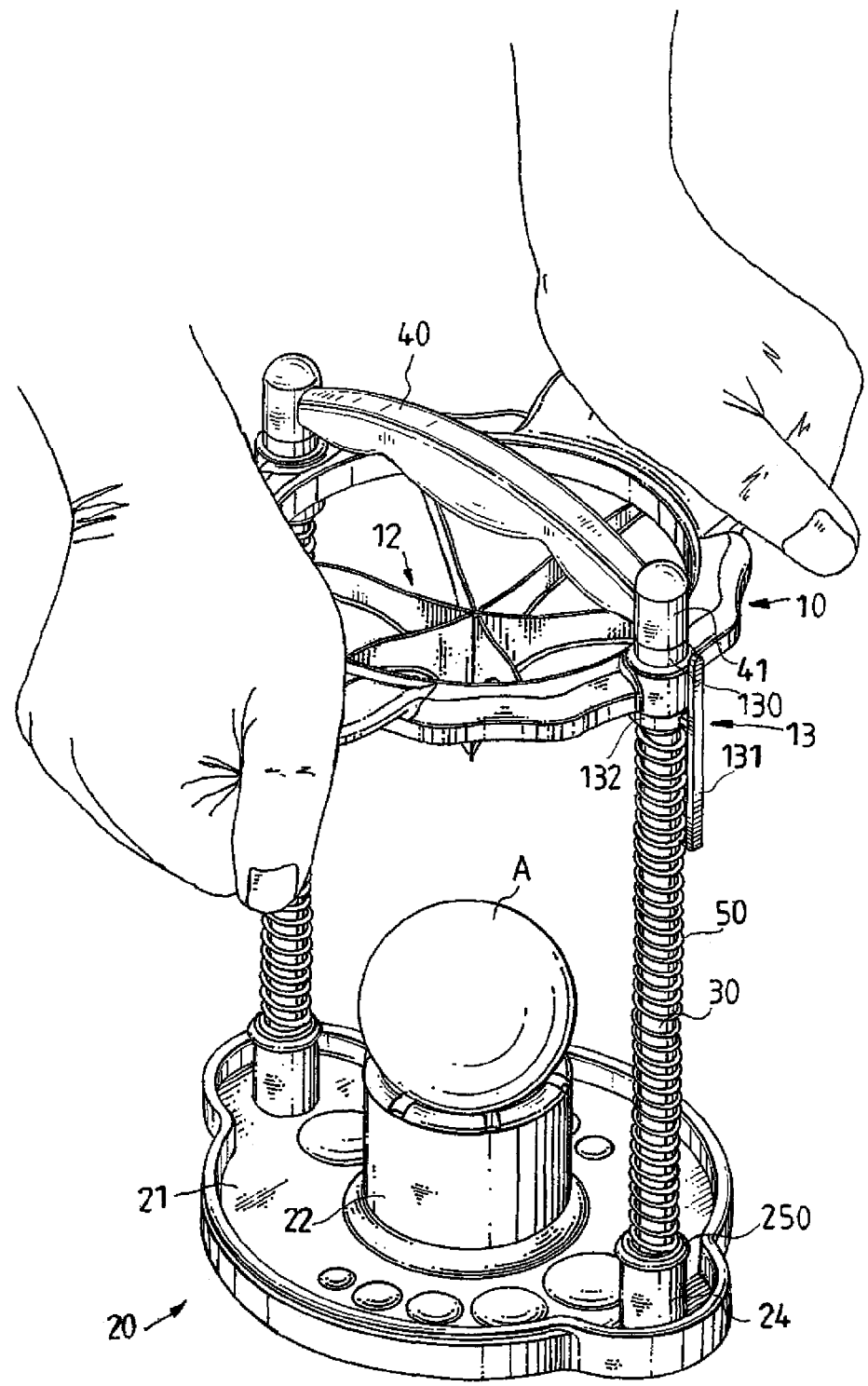
FIG. 5 is a schematic operational view of the fruit cutter as shown in FIG. 1.
Figure 6:
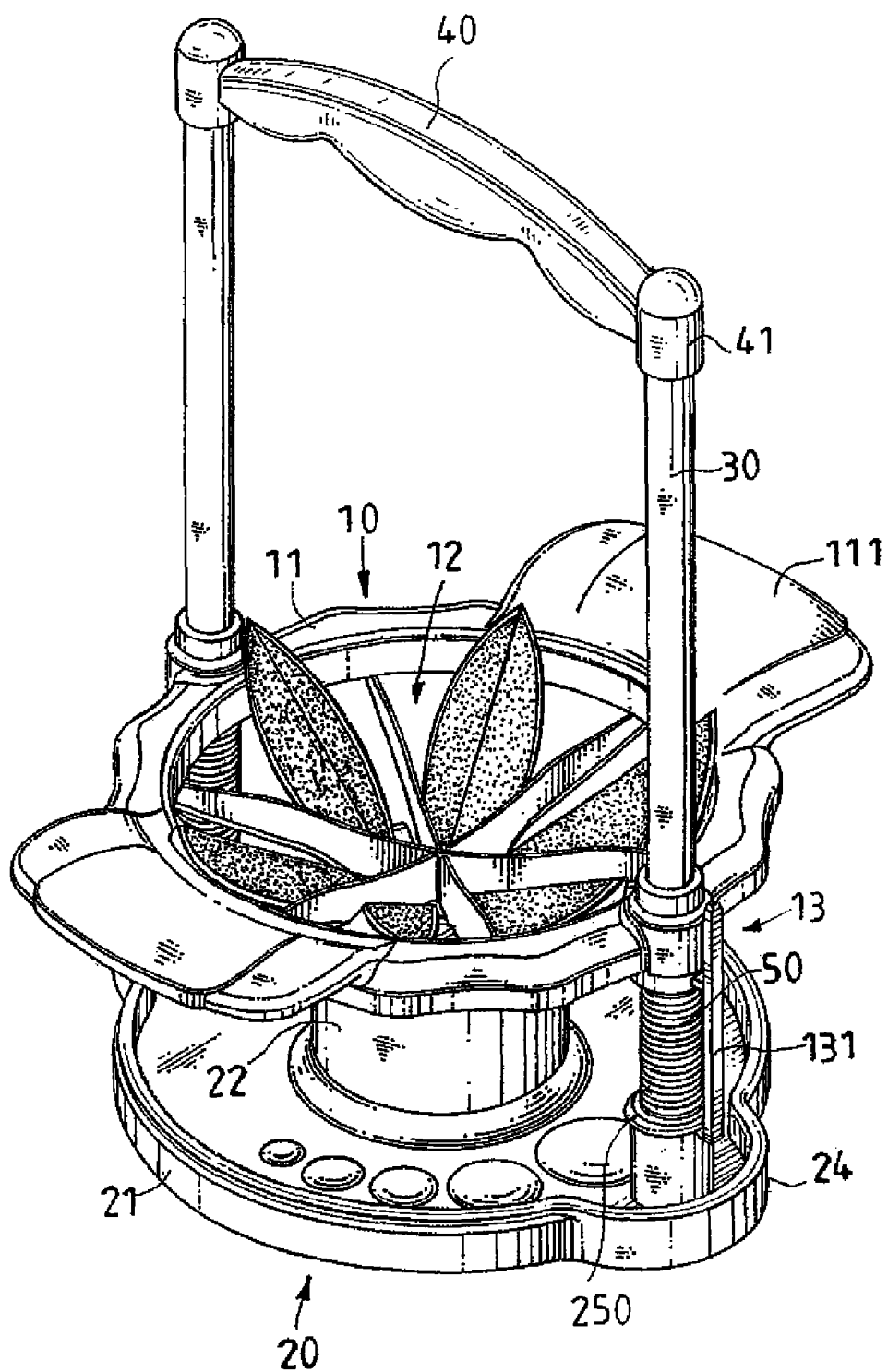
FIG. 6 is a schematic operational view of the fruit cutter as shown in FIG. 5.

In operation, referring to FIGS. 5 and 6 with reference to FIGS. 1-4, a fruit "A" is initially placed on the anvil 22 of the fixed seat 20 as shown in FIG. 5. Then, the cutting blades 120 of the blade unit 12 of the cutting device 10 are movable toward the anvil 22 of the fixed seat 20 to press the fruit "A" so that the fruit "A" is clamped between the cutting blades 120 of the blade unit 12 and the grooves 23 of the anvil 22 and is cut into a plurality of parts as shown in FIG. 6 by co-operation of the cutting blades 120 of the blade unit 12 with the grooves 23 of the anvil 22. At this time, the locking hook 131 of the locking unit 13 is movable to lock the locking flange 250 of the fixed ring 25 as shown in FIG. 4 after the cutting device 10 touches the fixed seat 20 to lock the movable seat 11 of the cutting device 10 onto the support member 21 of the fixed seat 20 so as to hidden the cutting blades 120 of the blade unit 12 in the grooves 23 of the anvil 22 to achieve a safety function and to facilitate the user removing the cut fruit "A" from the movable seat 11 of the cutting device 10.

In such a manner, the drilling portion 121 of the cutting blades 120 is inserted into a central portion of the fruit "A" to pierce the fruit "A" easily, while the cutting blades 120 of the blade unit 12 extend into the fruit "A" gradually from the central portion toward the rim of the fruit "A" to cut and separate the fruit "A" smoothly by guidance of the guide edge 122 of each of the cutting blades 120, so that the fruit "A" is cut into multiple parts easily and quickly. In addition, the cutting blades 120 of the blade unit 12 cut the fruit "A" gradually from the central portion toward the rim of the fruit "A", so that the cutting blades 120 of the blade unit 12 will not touch the surface of the fruit "A" to achieve a sanitary purpose. Further, the cutting blades 120 of the blade unit 12 extend through the fruit "A" into the grooves 23 of the anvil 22 so as to cut the fruit "A" completely.

Figure 7:
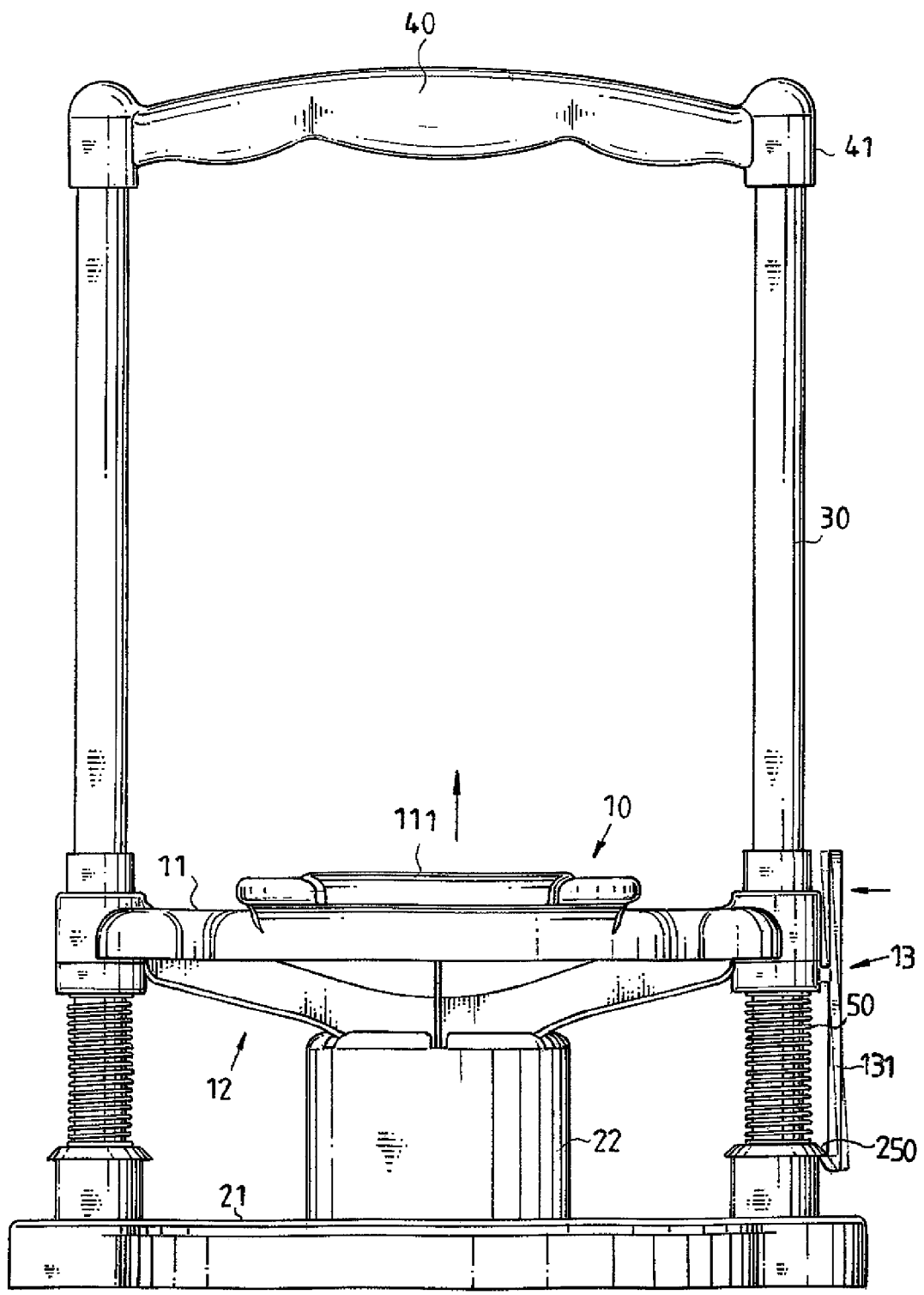
FIG. 7 is a schematic operational view of the fruit cutter as shown in FIG. 4.
Figure 8:
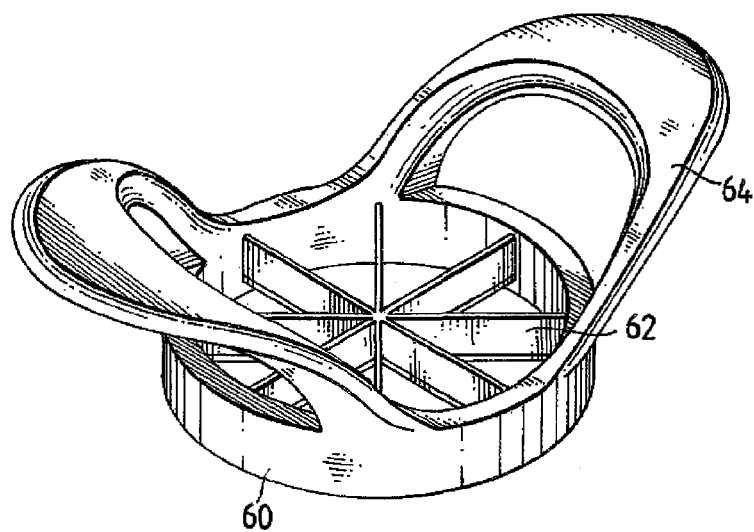
FIG. 8 is a perspective view of a conventional fruit cutter in accordance with the prior art.
Figure 9:
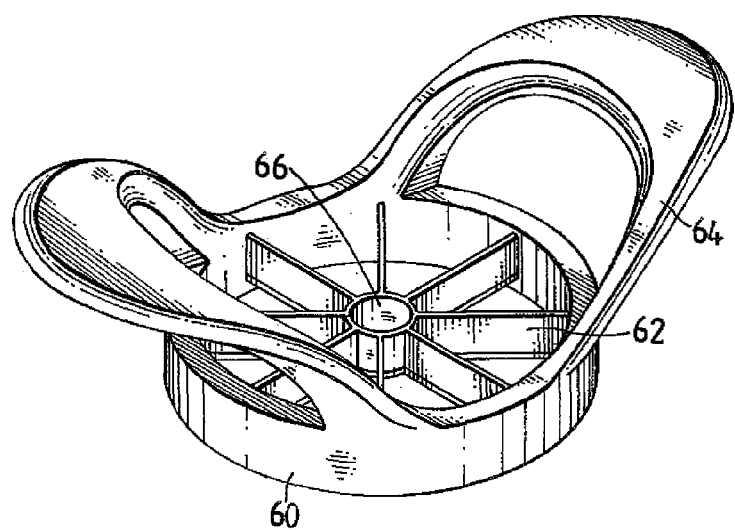
FIG. 9 is a perspective view of another conventional fruit cutter in accordance with the prior art.

As shown in FIG. 7, the locking hook 131 of the locking unit 13 is pulled outwardly to detach from the locking flange 250 to unlock the cutting device 10 from the fixed seat 20 so that the cutting device 10 is movable toward the pull handle 40 by the restoring force of the torsion springs 50.

Accordingly, the drilling portion 121 of the cutting blades 120 is inserted into the central portion of the fruit "A" to pierce the fruit "A" easily, while the cutting blades 120 of the blade unit 12 extend from the central portion toward the rim of the fruit "A" to cut and separate the fruit "A" smoothly by guidance of the guide edge 122 of each of the cutting blades 120, so that the fruit "A" is cut into multiple parts easily and quickly. In addition, the cutting blades 120 of the blade unit 12 cut the fruit "A" gradually from the central portion toward the rim of the fruit "A", so that the cutting blades 120 of the blade unit 12 will not touch the surface of the fruit "A" to achieve a sanitary purpose. Further, the cutting blades 120 of the blade unit 12 extend through the fruit "A" into the grooves 23 of the anvil 22 so as to cut the fruit "A" completely. Further, the locking hook 131 of the locking unit 13 is movable to lock the locking flange 250 of the fixed ring 25 after the cutting device 10 touches the fixed seat 20 to lock the movable seat 11 of the cutting device 10 onto the support member 21 of the fixed seat 20 so as to hidden the cutting blades 120 of the blade unit 12 in the grooves 23 of the anvil 22 to achieve a safety function.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

The invention claimed is:

1. A fruit cutter, comprising:
   a fixed seat;
   a cutting device movable relative to the fixed seat; wherein the cutting device includes an annular movable seat movable relative to the fixed seat, and a blade unit mounted in the movable seat; the blade unit of the cutting device includes a plurality of cutting blades movable toward the fixed seat; the cutting blades of the blade unit have an intersection provided with a substantially sharp tapered drilling portion that extends downward and is directed toward the fixed seat;

two opposite guide rods each having a lower end mounted on the fixed seat; wherein the cutting device is movably mounted between the two guide rods; the movable seat of the cutting device has a peripheral wall provided with two radially opposite mounting tubes each movably mounted on a respective one of the two guide rods; the support member of the fixed seat is provided with two opposite positioning sleeves for mounting the two guide rods;

at least one fixed ring inserted into one of the two positioning sleeves of the support member and provided with a protruding locking flange; and a locking unit including a movable ring inserted into one of the two mounting tubes of the movable seat to move therewith and a flexible locking hook mounted on the movable ring and movable to lock the locking flange of the fixed ring to lock the movable seat of the cutting device onto the support member of the fixed seat.

2. The fruit cutter in accordance with claim 1, wherein the drilling portion is located at a central portion of the cutting blades.

3. The fruit cutter in accordance with claim 1, wherein
each of the cutting blades of the blade unit has a first end connected to the movable seat and a second end connected to the drilling portion;
each of the cutting blades of the blade unit has a mediate portion provided with a concave guide edge located between the first end of each of the cutting blades and the drilling portion.

4. The fruit cutter in accordance with claim 1, further comprising:
a pull handle mounted an upper end of each of the two guide rods wherein the movable seat of the cutting device is movable between the fixed seat and the pull handle; and
two opposite torsion springs each mounted on a respective one of the two guide rods and each biased between the movable seat of the cutting device and the fixed seat to push the movable seat of the cutting device toward the pull handle.

5. The fruit cutter in accordance with claim 1, wherein the fixed seat includes
a support member to support the two guide rods; and
an anvil mounted on and protruding upwardly from a central portion of the support member.

6. The fruit cutter in accordance with claim 5, wherein the anvil of the fixed seat is located between the two guide rods.

7. The fruit cutter in accordance with claim 5, wherein the anvil of the fixed seat has a substantially circular shape.

8. The fruit cutter in accordance with claim 5, wherein the anvil of the fixed seat is provided with a plurality of axially extending grooves to allow insertion of the cutting blades of the blade unit.

9. The fruit cutter in accordance with claim 8, wherein
the cutting blades of the blade unit are arranged in a radiating manner in the movable seat and are spaced from each other in an equally angular manner; and
the grooves of the anvil are arranged in a radiating manner and are spaced from each other in an equally angular manner.

10. The fruit cutter in accordance with claim 8, wherein the grooves of the anvil have an intersection aligning with the drilling portion of the cutting blades.

11. The fruit cutter in accordance with claim 8, wherein the anvil of the fixed seat has a top provided with a concave face connected to the grooves.

12. The fruit cutter in accordance with claim 1, wherein
the fixed ring is located between the one of the two positioning sleeves of the support member and the lower end of a respective one of the two guide rods; and
the locking flange the of fixed ring protrudes outwardly from the one of the two positioning sleeves of the support member.

13. The fruit cutter in accordance with claim 1, wherein
the movable ring of the locking unit is located between the one of the two mounting tubes of the movable seat and the upper end of a respective one of the two guide rods; and
the movable ring of the locking unit has a lower end provided with a protruding stop flange abutting a lower end of the one of the two mounting tubes of the movable seat.

14. The fruit cutter in accordance with claim 13, wherein the locking hook of the locking unit is formed on and extends outwardly from the stop flange of the movable ring so that the locking hook of the locking unit is spaced from the one of the two mounting tubes of the movable seat.

15. The fruit cutter in accordance with claim 4, wherein the pull handle has two opposite ends each provided with a protruding mounting sleeve mounted on the upper end of a respective one of the two guide rods.

16. The fruit cutter in accordance with claim 1, wherein the movable seat of the cutting device has an inner wall provided with a mounting hole for mounting the blade unit.

17. The fruit cutter in accordance with claim 1, wherein the peripheral wall of the movable seat is provided with two radially opposite protruding holding portions to facilitate a user holding the movable seat of the cutting device.

* * * * *